US009534406B2

(12) United States Patent
Nielsen et al.

(10) Patent No.: US 9,534,406 B2
(45) Date of Patent: Jan. 3, 2017

(54) ADJUSTABLE STRUT WITH LOCKING MECHANISM

(71) Applicant: Paratech, Incorporated, Frankfort, IL (US)

(72) Inventors: Kenneth E. Nielsen, Chicago, IL (US); William O. Teach, Frankfort, IL (US)

(73) Assignee: Paratech, Incorporated, Frankfort, IL (US)

( * ) Notice: Subject to any disclaimer, the term of this patent is extended or adjusted under 35 U.S.C. 154(b) by 125 days.

(21) Appl. No.: 14/503,943

(22) Filed: Oct. 1, 2014

(65) Prior Publication Data

US 2016/0097210 A1    Apr. 7, 2016

(51) Int. Cl.
| | |
|---|---|
| *F16F 1/12* | (2006.01) |
| *E04G 25/06* | (2006.01) |
| *E04G 25/04* | (2006.01) |

(52) U.S. Cl.
CPC ............. *E04G 25/061* (2013.01); *E04G 25/04* (2013.01); *F16F 1/128* (2013.01); *F16F 2236/04* (2013.01)

(58) Field of Classification Search
USPC ......... 248/354.1, 354.3, 354.4, 354.5, 354.6, 248/354.7; 403/109.1, 109.5, 109.6, 109.8
See application file for complete search history.

(56) References Cited

U.S. PATENT DOCUMENTS

| | | | | |
|---|---|---|---|---|
| 3,469,870 A | * | 9/1969 | Barkus | E04G 25/06 108/150 |
| 3,870,278 A | * | 3/1975 | Lee | B66F 3/14 248/354.3 |
| 6,394,405 B1 | | 5/2002 | Roxton et al. | |
| 6,634,826 B1 | * | 10/2003 | Marsetti | B65G 21/2072 24/115 G |
| 7,980,781 B2 | * | 7/2011 | Trice | B25G 1/04 403/109.3 |
| 8,007,196 B2 | * | 8/2011 | Whitling | F16B 7/042 403/109.1 |
| 8,033,527 B2 | | 10/2011 | Pasto | |
| 8,490,939 B2 | | 7/2013 | Pasto | |

* cited by examiner

*Primary Examiner* — Alfred J Wujciak
(74) *Attorney, Agent, or Firm* — Banner & Witcoff, Ltd.

(57) ABSTRACT

An adjustable strut having a locking mechanism configured to removably-secure a pair of telescopic structural members to one another when positioned in a contracted configuration for transport and storage. Further, the locking mechanism allows for fast and intuitive unlocking of the pair of telescopic structural members for adjustment of a length of the strut for structural bracing.

9 Claims, 15 Drawing Sheets

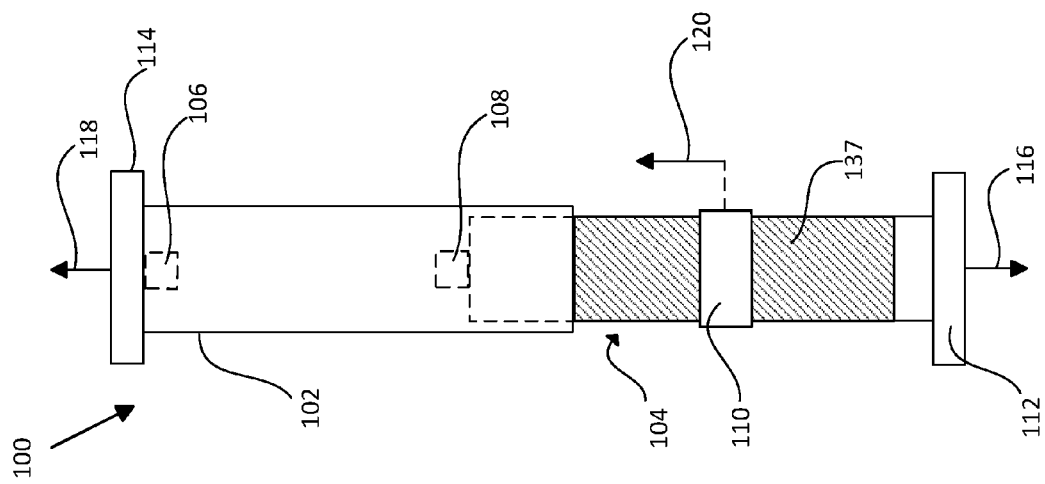
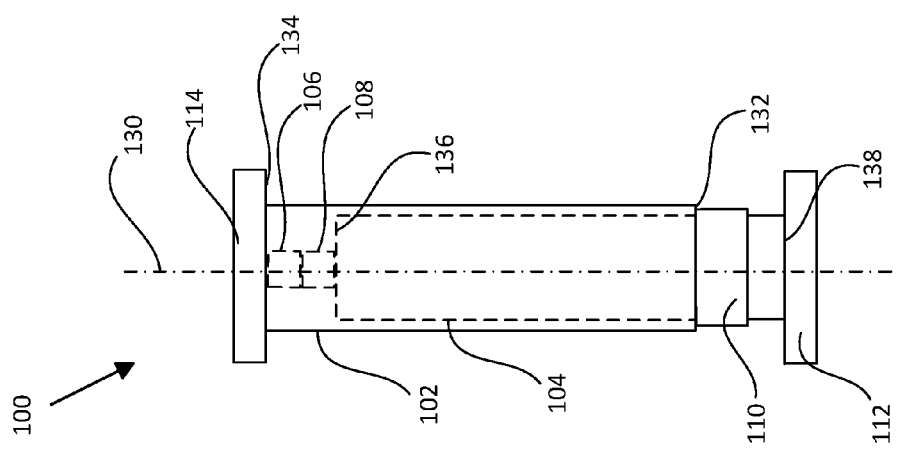
FIG. 1B
FIG. 1A

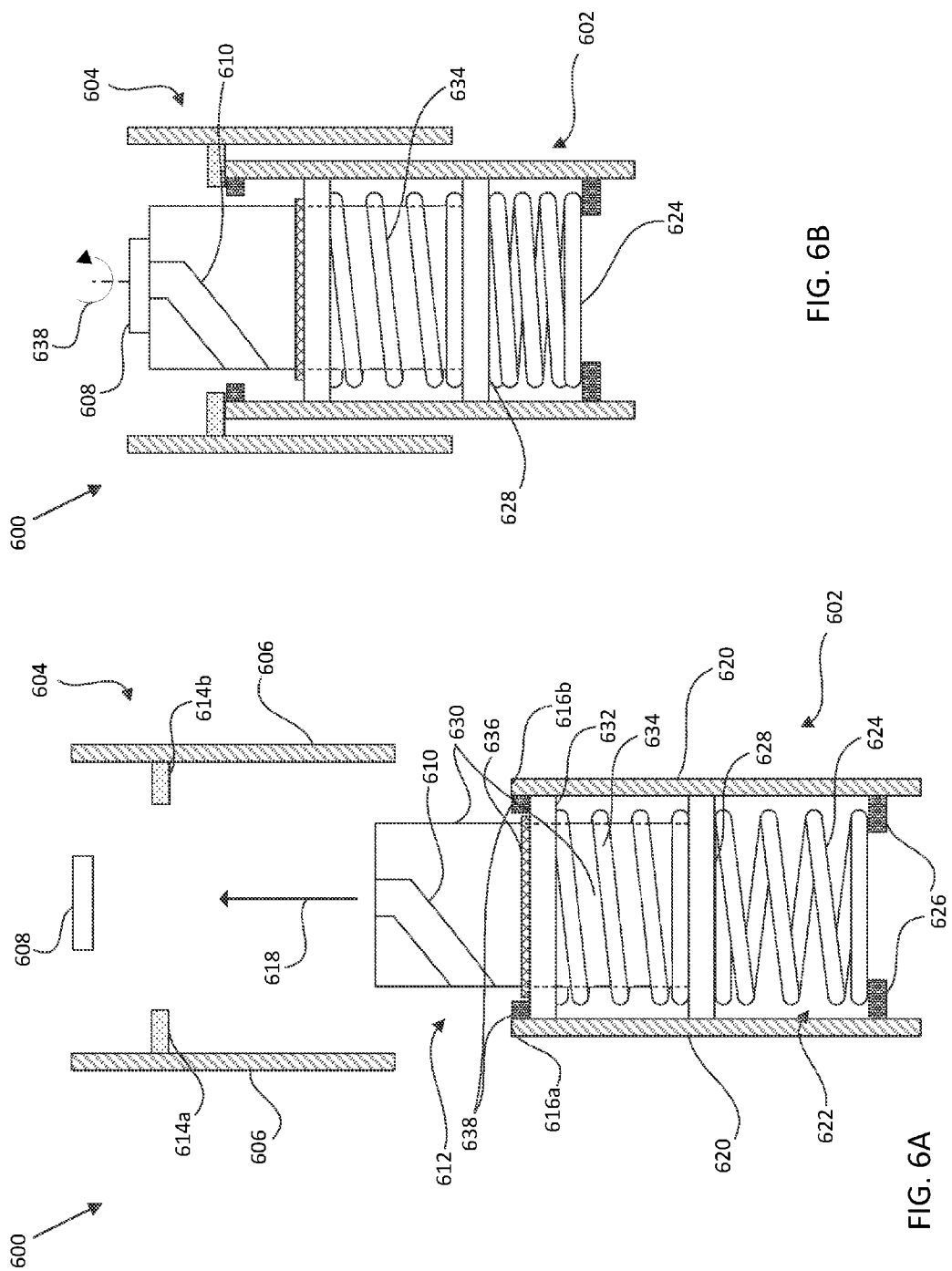

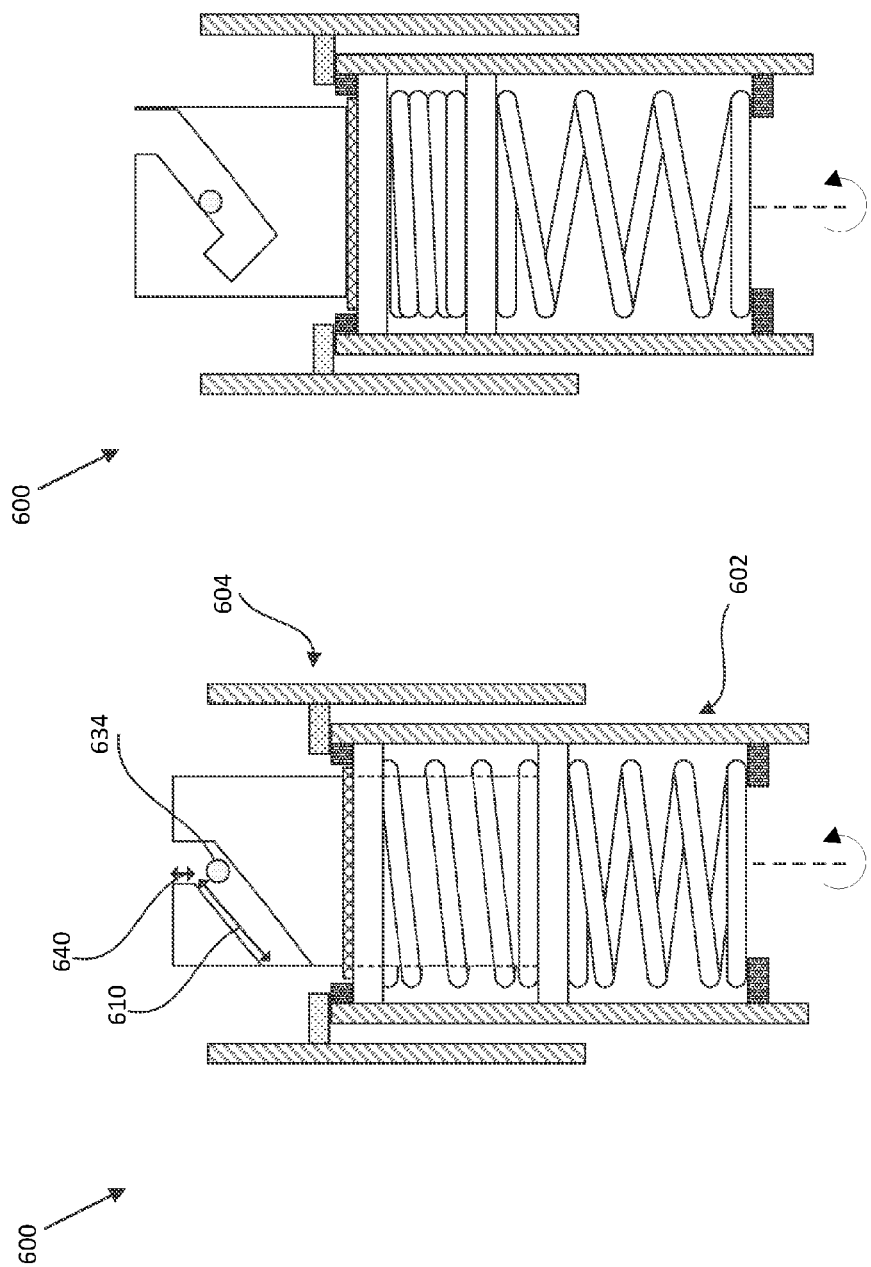

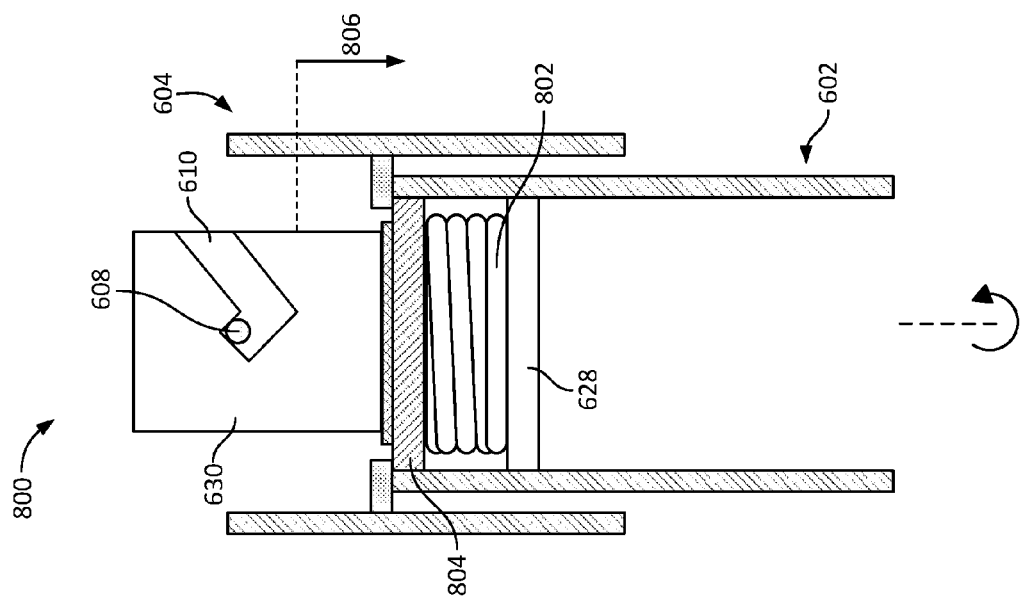

ADJUSTABLE STRUT WITH LOCKING MECHANISM

BACKGROUND

An adjustable strut may be utilized to brace an unstable structure. For example, one or more adjustable struts may be positioned to bear part, or all, of a weight of one or more of a wall, a ceiling, or a roof of an unstable structure. In another example, one or more adjustable struts may be positioned to reinforce one or more damaged structures within a ship, such as bulkheads, sections of a hull, or one or more hatches. In yet another example, one or more adjustable struts may be positioned to brace one or more unstable structures of a vehicle following an accident. Accordingly, an adjustable strut may be utilized by emergency services, or other users, in time-sensitive situations where there is a possibility of structural failure of one or more load-bearing elements.

In one example, an adjustable strut may comprise a pair of structural members configured to allow a user to adjust a length of the strut between a contracted position, configured for ease of portability and storage, and a fully-extended position. As such, a first structural member of an adjustable strut may be configured to slide into a bore of a second structural member, to facilitate adjustment of a length of the strut. In one example, the first structural member may be loosely-positioned within the second structural member when in the contracted position. Accordingly, due to this loose connection, the pair of structural members may be inadvertently separated from one another during transport to a location where the strut's length is to be adjusted for structure bracing. As a result, valuable time may be lost in recovering and reconfiguring the separated members. In another example, the two structural members may inadvertently slide relative to one another from a contracted position to an extended position while the adjustable strut is transported. This inadvertent sliding may be as a result of, among others, a change in orientation of the adjustable strut as it is transported, or as a result of the adjustable strut being inadvertently dropped. As such, this inadvertent sliding may make transporting the adjustable strut cumbersome.

In another example, a pair of structural members of an adjustable strut may be locked together in a contracted position. However, the operation of the locking mechanism utilized in such an adjustable strut may not be readily intuitive, or sufficiently fast enough for disengagement in a time-sensitive situation.

Accordingly, a need exists for an adjustable strut, configured to brace an unstable structure, and having an improved locking mechanism allowing for fast adjustment of the strut from a collapsed (transport) position to an extended position.

BRIEF SUMMARY

One or more of the above-mentioned needs in the art are satisfied by aspects described herein. According to one aspect, an adjustable strut may have an outer housing configured to receive a cylindrical extendable member into a contracted position. The adjustable strut may further have a lock mechanism for removably-coupling the outer housing to the cylindrical extendable member. The lock mechanism may further have a cylindrical shaft having a cam channel for receiving a pin that is rigidly-coupled to the outer housing, a base plate that is rigidly-coupled to the cylindrical shaft, and a compression element sandwiched between the base plate and an upper plate along the cylindrical shaft. As such, rotation of the cylindrical extendable member relative to the outer housing causes the pin to travel along the cam channel to a lock position, and simultaneously urges the base plate towards the upper plate, thereby compressing the compression element, and exerting a retention force on the pin.

According to another aspect, a telescopic support strut may have an outer housing configured to receive a cylindrical extendable member into a contracted position. The telescopic support strut may further have a lock mechanism for removably-coupling the outer housing to the cylindrical extendable member when in the contracted position. The lock mechanism may further have a first lock structure rigidly-coupled to the outer housing, a second lock structure retained within a cavity in the cylindrical extendable member, and such that when the first lock structure is engaged with the second lock structure, the cylindrical extendable member is removably-coupled to the outer housing by rotating the outer housing relative to the cylindrical extendable member.

In yet another aspect, a telescopic support strut has an outer housing configured to receive a cylindrical extendable member into a contracted position. The telescopic support strut further has a lock mechanism for removably-coupling the outer housing to the cylindrical extendable member when in the contracted position. The lock mechanism further has a threaded receiver coupled to the outer housing, and a spring-loaded connector coupled to the cylindrical extendable member. As such, the outer housing may be removably-coupled to the cylindrical extendable member by engaging the spring-loaded connector with the threaded receiver by rotating the cylindrical extendable member relative to the outer housing.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which:

FIGS. 1A-1C schematically depict various configurations of an adjustable strut device, according to one or more aspects described herein.

FIGS. 6A-6E schematically depict various configurations of one implementation of a telescopic support strut, according to one or more aspects described herein.

FIGS. 8A-8C schematically depict various configurations of another implementation of a telescopic support strut, according to one or more aspects described herein.

Figure 1C:
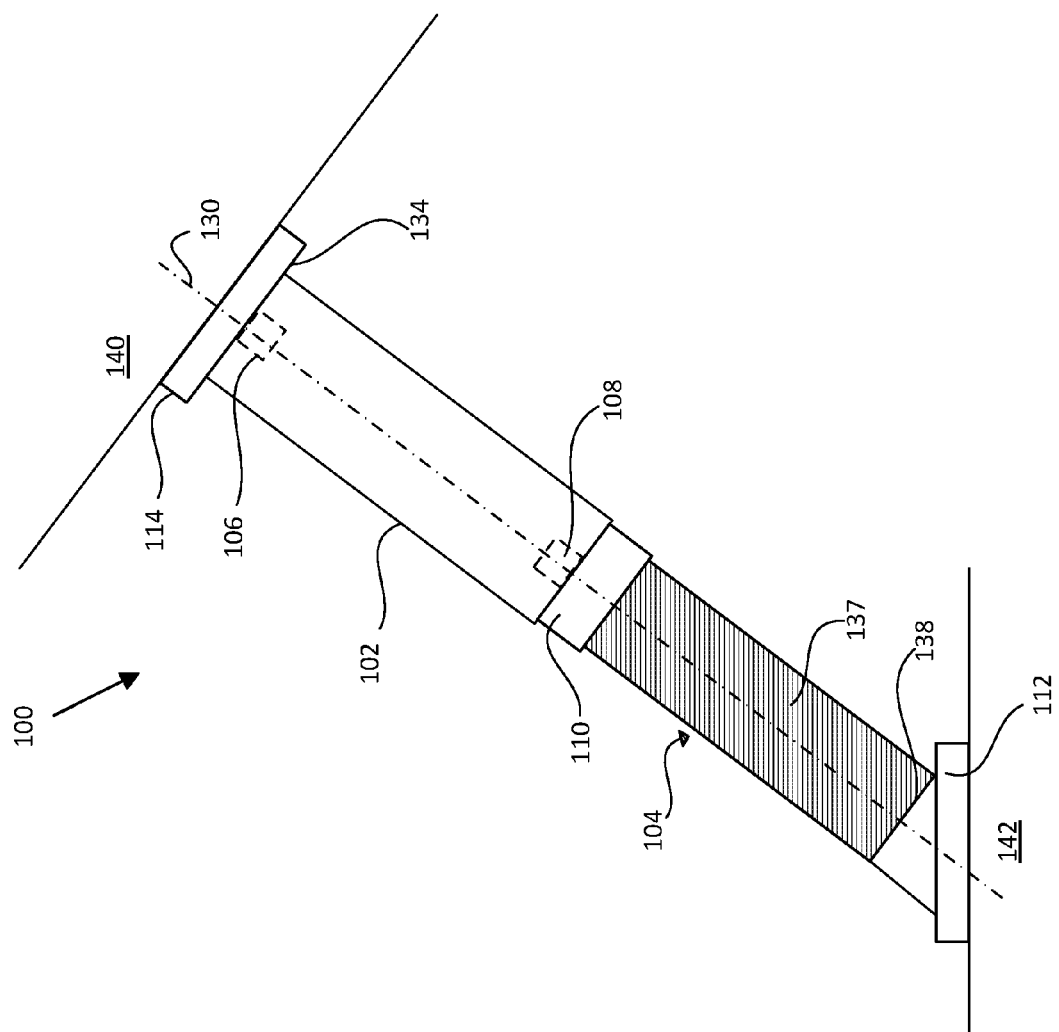

Further, it is to be understood that the drawings may represent the scale of different component of one single embodiment; however, the disclosed embodiments are not limited to that particular scale.

DETAILED DESCRIPTION

Aspects of this disclosure relate to an adjustable strut having a locking mechanism configured to removably-couple a pair of telescopic structural members to one another when configured in a collapsed position for transport and storage. Further, the locking mechanism may allow for fast and intuitive unlocking of the pair of telescopic structural members for adjustment of a length of the strut for structural bracing.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure.

FIG. 1A schematically depicts an adjustable strut device 100. In particular, FIG. 1A depicts the adjustable strut device 100 in a substantially contracted position, otherwise referred to as a collapsed, contracted, or transport position/configuration. Accordingly, the adjustable strut device 100 comprises an outer housing 102, a cylindrical extendable member 104, a first lock structure 106 coupled to the outer housing 102, and a second lock structure 108 coupled to the cylindrical extendable member 104.

In one example, the outer housing 102 may be configured to slide relative to the cylindrical extendable member 104 along a longitudinal axis 130 of the adjustable strut device 100. As such, the outer housing 102 may be configured with a cylindrical bore (not shown), and the cylindrical extendable member 104 may be sized to be received into this bore. In particular, a first end 136 of the cylindrical extendable member 104 may be received into the cylindrical bore at a first end 132 of the outer housing 102. In one implementation, the outer housing 102 and the cylindrical extendable member 104 may have longitudinal lengths along that longitudinal axis 130. Accordingly, the first end 136 of the cylindrical extendable member 104 may be configured to slide relative to the outer housing 102 between the first end 132 of the outer housing 102, and a second end 134 of the outer housing 102.

In one example, the outer housing 102 may have a substantially cylindrical shape. However, in another implementation, the outer housing 102 may comprise a cuboidal, or a prism shape, or any other elongated shape configured to oppose a compressive force acting along the longitudinal axis 130 of the adjustable strut device 100, without departing from the scope of the disclosures described herein.

When configured in a collapsed position, as schematically depicted in FIG. 1A, the adjustable strut device 100 may engage the first lock structure 106 with the second lock structure 108 to removably-couple the outer housing 102 to the extendable member 104. Accordingly, this removable coupling may allow the adjustable strut device 100 to be transported and stored without the outer housing 102 and the cylindrical extendable member 104 being inadvertently separated from one another. Further details of this locking mechanism (elements 106 and 108) are described in the following sections of this paper.

FIG. 1B schematically depicts the adjustable strut device 100 in an extended position between the collapsed position of FIG. 1A, and a fully-extended position, depicted in FIG. 1C. As such, the cylindrical extendable member 104 is depicted in FIG. 1B as partially extended out of the first end 132 of the outer housing 102. Arrows 116 and 118 schematically depict a manual force applied to the adjustable strut device 100 to adjust an overall length of the adjustable strut device 100 by sliding the outer housing 102 relative to the cylindrical extendable member 104.

In one example, the adjustable strut device 100 may comprise a threaded collar 110. Further, the cylindrical extendable member 104 may have a thread structure 137 (one or more helical grooves) along a longitudinal length of an outer surface of the cylindrical extendable member 104. This thread structure 137 is more clearly depicted as structure 304 from FIG. 3. Accordingly, in one example, the threaded collar 110 may be configured to engage with the thread structure 137 of the cylindrical extendable member 104, such that the threaded collar 110 may linearly-translate along the longitudinal length of the cylindrical extendable member 104 by screwing the threaded collar 110 along the thread structure 137 of the cylindrical extendable member 104. As such, arrow 120 schematically depicts the threaded collar 110 translating along the longitudinal length of the cylindrical extendable member 104.

Accordingly, in one example, the threaded collar 110 may be configured to abut/contact the first end 132 of the outer housing 102 in order to selectively configure the adjustable strut device 100 with a length between a fully-extended position, as depicted in FIG. 1C, and a contracted position, as depicted in FIG. 1A.

In one example, the adjustable strut device 100 may be configured to engage with one or more support adapter devices. In particular, the cylindrical extendable member 104 may be configured to engage with a first support adapter device 112 at a second end 138 of the cylindrical extendable member 104, and the outer housing 102 may be configured to engage with a second support adapter device 114 at the second end 134 of the outer housing 102. In one implementation, the first and the second support adapter devices 112 and 114 may be configured to provide an interface between one or more structures/surfaces to be reinforced, and the adjustable strut device 100. As such, the first and the second support adapter devices 112 and 114 may be configured to transmit a compressive force from a structure to be braced, through to the adjustable strut device 100, and such that the adjustable strut device 100 is compressed along the longitudinal axis 130. In this way, the first and the second support adapter devices 112 and 114 may comprise one or more structural elements configured to engage the adjustable strut device 100 with one or more surfaces 140 and 142. As such, surfaces 140 and 142 may comprise any surface geometry and/or orientation. Additionally or alternatively, the first and the second support adapter devices 112 and 114 may be configured to couple the adjustable strut device 100 to alternative structural elements including, among others, chains, pipes, or beams, among others. As schematically depicted in FIG. 1C, a support adapter device, such as support adapter device 112, may be configured to couple the adjustable strut device 100 to a surface 142, and such that surface 142 may be angled relative to the longitudinal axis 130 of the adjustable strut device 100.

In one example, one or more elements of the adjustable strut device 100 may be constructed from 6061 Aluminum. However, those of ordinary skill in the art will recognize that the adjustable strut device 100 may be constructed from any structural material having mechanical properties suitable for forming one or more of the structures described herein, and capable of withstanding mechanical stresses associated with the operation of the adjustable strut device 100. As such, one or more elements of the adjustable strut device 100 may be constructed using one or more of a metal, an alloy, a ceramic, a polymer, a fiber-reinforced material, or combinations thereof, without departing from the scope of the disclosures described herein. Additionally, those of ordinary skill in the art will recognize that the elements depicted in the accompanying figures are for schematic illustration purposes only, and that the relative sizes of the depicted elements may vary, without departing from the scope of the disclosures described herein. Further, those of ordinary skill in the art will recognize that the various elements described in this disclosure may be modified (scaled/have lengths and/or thicknesses of one or more structural elements adjusted) without departing from the scope of the disclosures described herein.

Figure 2:
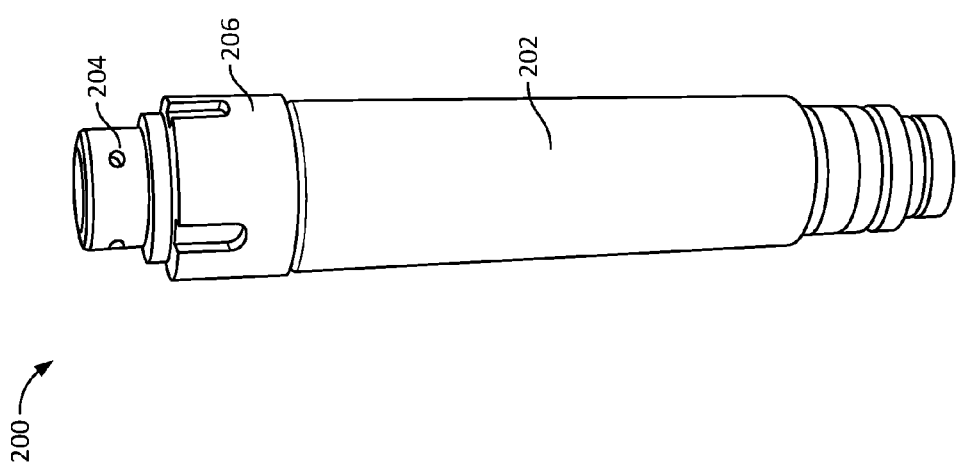
FIG. 2 depicts one implementation of an adjustable strut device in a contracted configuration, according to one or more aspects described herein.

FIG. 2 depicts an adjustable strut device 200. In one example, the adjustable strut device 200 may be similar to that adjustable strut device 100 schematically depicted in FIGS. 1A-1C. As such, the adjustable strut device 200 may comprise an outer housing 202. In one example, the outer housing 202 may be similar to the outer housing 102 schematically depicted in FIGS. 1A-1C. Further, the adjustable strut device 200 may comprise a cylindrical extendable member 204, similar to the cylindrical extendable member 104 from FIGS. 1A-1C. Additionally, the adjustable strut device 200 may comprise a collar structure 206 similar to the threaded collar 110 from FIGS. 1A-1C.

Figure 3:
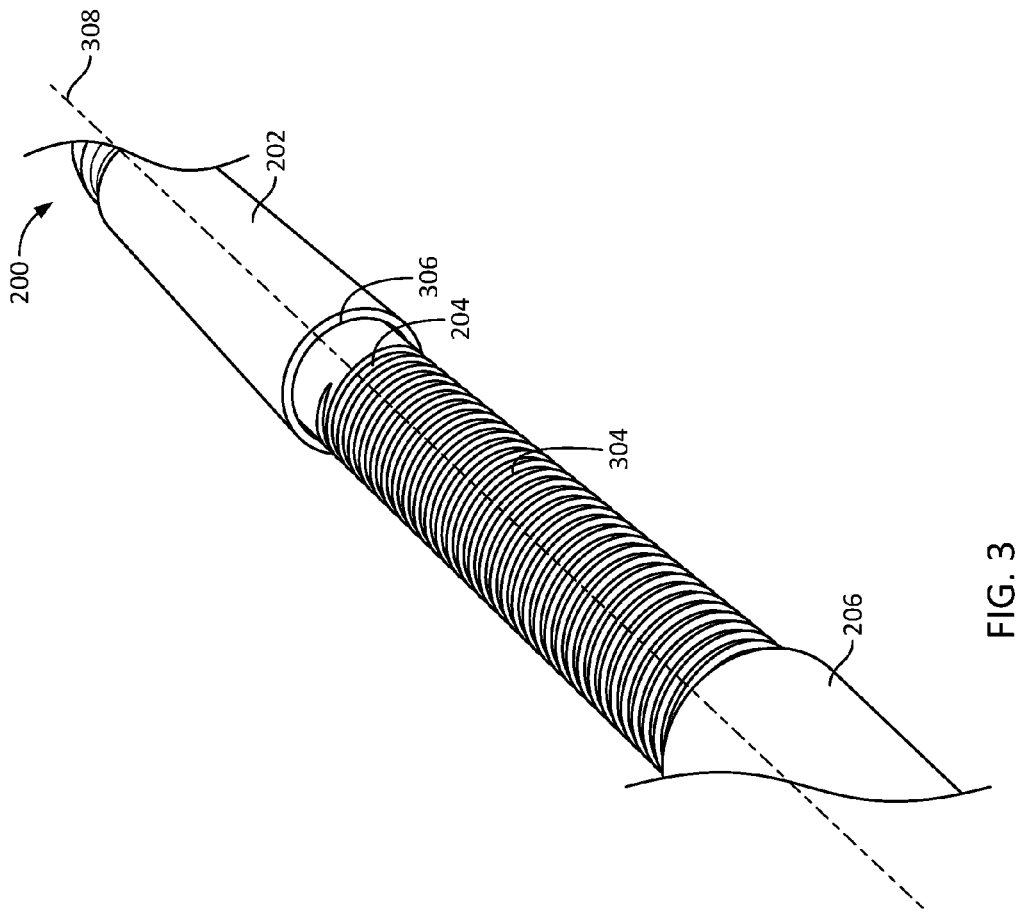
FIG. 3 depicts one implementation of an adjustable strut device in an extended configuration, according to one or more aspects described herein.

In one example, the adjustable strut device 200 is depicted in FIG. 2 in a contracted position, otherwise referred to as a collapsed position. Referring to FIG. 3, the adjustable strut device 200 is depicted in an extended position, such that the cylindrical extendable member 204 has been manually-extended out from a bore 306 in the outer housing 202 along a longitudinal axis 308 through the adjustable strut device 200. As such, in the extended position depicted in FIG. 3, a thread structure 304 of the cylindrical extendable member 204, similar to the thread structure 137 of the cylindrical extendable member 104 from FIGS. 1A-1C, is exposed. Accordingly, and similar to the engagement of the threaded collar 110 with the thread structure 137 from FIGS. 1A-1C, the thread structure 304 may be configured to engage with the collar structure 206, and such that the collar structure 206 may be screwed along the thread structure 304 to translate the collar structure 206 along the longitudinal axis 308 of the adjustable strut device 200.

Figure 4:
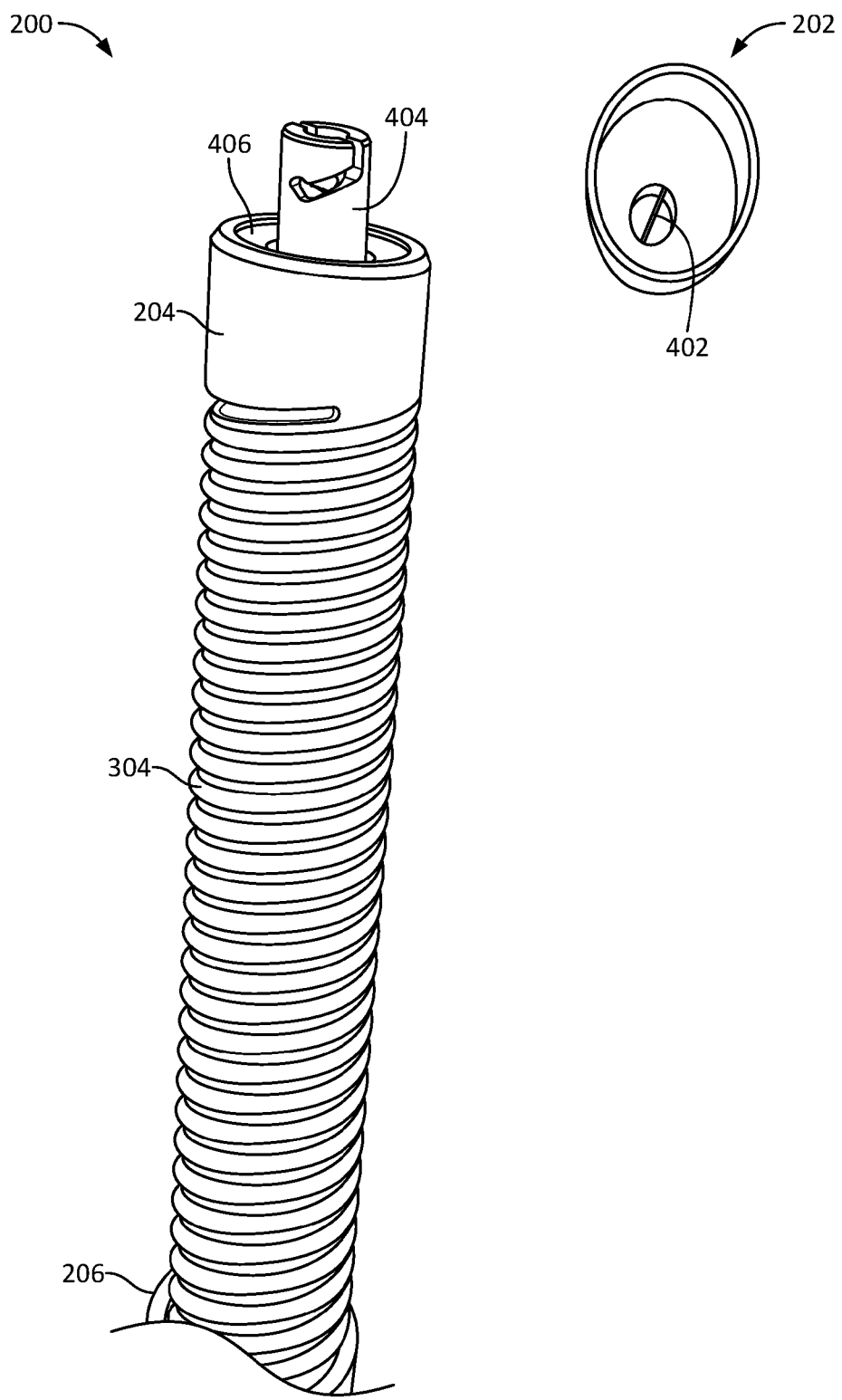
FIG. 4 depicts one implementation of an adjustable strut device having a cylindrical extendable member separated from an outer housing, according to one or more aspects described herein.

FIG. 4 depicts the adjustable strut device 200 having the cylindrical extendable member 204 separated from the outer housing 202. In one implementation, FIG. 4 depicts the outer housing having a first lock structure 402, similar to the first lock structure 106 schematically-depicted in FIGS. 1A-1C, and the cylindrical extendable member 204 having a second lock structure 404, similar to the second lock structure 108 schematically-depicted in FIGS. 1A-1C. In particular, the second lock structure 404 may be referred to as a lock mechanism 404, and configured to be received into a cavity 406 in an end of the cylindrical extendable member 204. Further details of this lock mechanism 404 are described in relation to FIGS. 5-7. In one example, the first lock structure 402 may be a pin structure 402 configured to extend across at least part of a diameter of the bore 306 of the outer housing 202. As such, the pin structure 402 may be configured to be received into the lock mechanism 404 in order to removably-couple the cylindrical extendable member 204 to the outer housing 202.

Figure 5A:
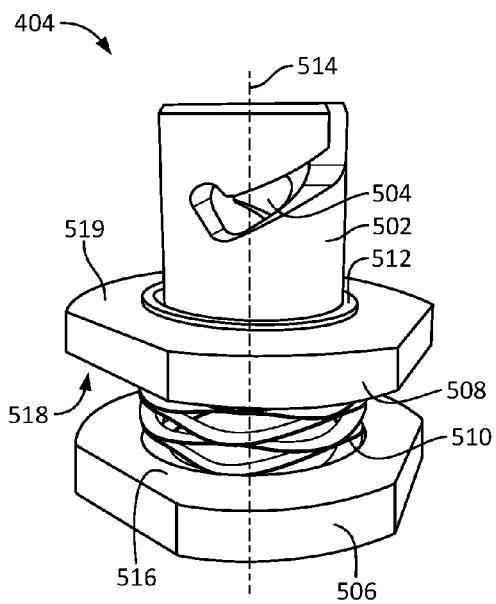
FIGS. 5A-5C depict different views of a lock mechanism, according to one or more aspects described herein.

FIG. 5A depicts an isometric view of the lock mechanism 404, as removed from the cavity 406 of the cylindrical extendable member 204. In particular, the lock mechanism 404 may comprise a cylindrical shaft structure 502 having a cam channel 504 at a first end. In one example, the cam channel 504 may be configured to receive the pin structure 402. Additionally, the lock mechanism 404 may comprise a base plate structure 506 that is rigidly-coupled to the cylindrical shaft structure 502 at a second end. An upper plate structure 508 may comprise a bore configured to receive the cylindrical shaft structure 502, and the upper plate structure 508 may be configured to slide along a longitudinal axis 514 of the cylindrical shaft 502. The lock mechanism 404 may further comprise a compression element 510. The compression element 510 may be sandwiched between a first surface 516 of the base plate structure 506 and a first surface 518 of the upper plate structure 508. Accordingly, the compression element 510 may be configured to compress along the longitudinal axis 514 of the lock mechanism 404, and configured to urge the upper plate structure 508 towards a retainer element 512 positioned along the cylindrical shaft structure 502. In one example, a second surface 519 of the upper plate structure 508 may be configured to contact the retainer element 512. In one example, the retainer element 512 may be a retainer ring, and the like.

Figure 5B:
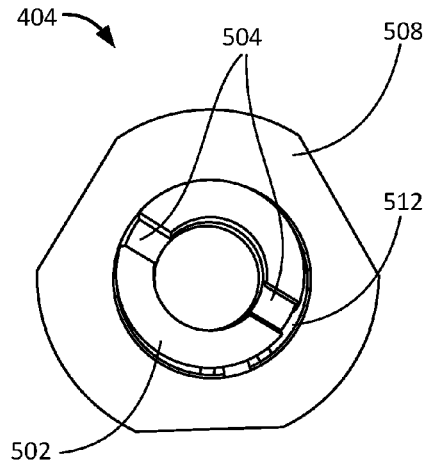

FIG. 5B depicts a plan view of the lock mechanism 404. As such, FIG. 5B illustrates a one implementation of a shape of the upper plate structure 508. In particular, the upper plate structure 508 may be configured with a non-circular shape configured to be received into the cavity 406 in the cylindrical extendable member 204. As such, the cavity 406 may comprise a substantially similar shape to that of the upper plate structure 508. In this way, the non-circular shape of the upper plate structure 508 and the cavity 406 may be configured to prevent rotation of the lock mechanism 404 relative to the cylindrical extendable member 204. Those of ordinary skill in the art will recognize that the depicted shape of the upper plate structure 508 is merely one example of a non-circular shape that may be employed by the lock mechanism 404, and any non-circular shape may be utilized without departing from the scope of the disclosures described herein. As such, in one implementation, the upper plate structure 508 may be configured with a substantially circular shape, and have one or more tab elements cut out of the substantially circular shape. In turn, these one or more tab elements may be configured to engage with one or more complementary tab elements within the cavity 406 of the cylindrical extendable member 204, thereby preventing relative rotation of the lock mechanism 404 and the cylindrical extendable member 204.

Figure 5C:
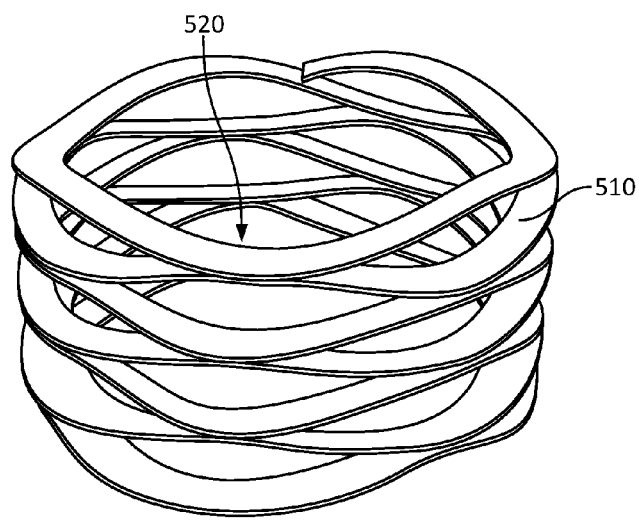

FIG. 5C depicts one implementation of the compression element 510 as removed from the lock mechanism 404. In particular, the compression element 510 comprises a bore, or hole 520 configured to receive the cylindrical shaft 502. As such, in one implementation, the compression element 510 may be configured with an annular structure, and maybe configured to compress along the longitudinal axis 514 of the lock mechanism 404. In one example, the compression element 510 may comprise a leaf spring structure. In another example, the compression element 510 may comprise a coil spring structure. In yet another example, the compression element 510 may comprise a flexure, or another deformable material structure. As such, the compression element 510 may comprise one or more of a metal, an alloy, a polymer, a fiber-reinforced material, or any material with mechanical properties (Young's modulus, spring constant, among others), suitable for the operation of the lock mechanism 404. Additionally, those of ordinary skill in the art will recognize that various additional or alternative designs of compression element 510 to that depicted in FIG. 5C may be utilized with lock mechanism 404, without departing from the scope of the disclosures described herein.

FIG. 6A schematically depicts a first configuration of a telescopic support strut 600, otherwise referred to as an adjustable strut, or simply, a strut structure. In one implementation, the telescopic support strut 600 may be configured to facilitate removable-coupling between an outer housing 604 and a cylindrical extendable member 602 when in a contracted position configured for storage and transport of the telescopic support strut 600. In particular, the outer housing 604 may be similar to outer housing 102 and outer housing 202 from FIG. 1 and FIG. 2, respectively. As such, the outer housing 604 may be schematically depicted as comprising a wall structure 606. In one example, the wall structure 606 may form part of a cylindrical shape of the outer housing 604. Additionally, the outer housing 604 may comprise a first lock structure 608. In one implementation, this first lock structure 608 may be a pin structure 608, or a tab structure 608, and configured to be received into a cam channel 610 of a lock mechanism 612. Additionally, the outer housing 604 may comprise retention elements 614a and 614b, and such that retention elements 614a and 614b may be configured to abut/contact a first end of the cylindrical extendable member 602 at those schematically-depicted points of contact 616a and 616b.

In one implementation, FIG. 6A schematically depicts the cylindrical extendable member 602 being moved, along that direction indicated by arrow 618, into a contracted configuration with the outer housing 604. As such, FIG. 6A schematically depicts the cylindrical extendable member 602 sliding relative to the outer housing 604 along a longitudinal axis corresponding to that depicted arrow 618.

In one example, the cylindrical extendable member 602 is schematically-depicted as comprising an outer wall structure 620. A cavity structure 622 may be formed within the first end of the cylindrical extendable member 602, and configured to receive the lock mechanism 612. In one implementation, the lock mechanism 612 comprises a first compression element 624 sandwiched between (compressed between) a retaining surface 626 and a base plate 628. Further, the base plate 628 may be rigidly-coupled to a cylindrical shaft structure 630. Sandwiched between the base plate 628 and an upper plate 632 is a second compression element 634. In one implementation, one or more of the first compression element 624 and/or at the second compression element 634 may comprise the coil spring, a leaf spring, or a flexure structure, among others.

In one example, the second compression element 634 may be configured to urge the upper plate 632 towards a first retainer element 636. In one example, the first retainer element 636 may be a retainer ring. However, those of ordinary skill in the art will recognize various additional or alternative structures that may be utilized to implement the first retainer element 636, without departing from the scope of the disclosures described herein. In one example, the base plate 628, the second compression element 634, the upper plate 632, the first retainer element 636, and the cylindrical shaft structure 630 may be configured to slide relative to the outer wall structure 620 within the cavity structure 622. As such, the upper plate 632 may be prevented from sliding out of the cavity structure 622 by a second retainer element 638. As such, in one example, the second retainer element 638 may be a retainer ring. However, those of ordinary skill in the art will recognize various additional or alternative structures that may be utilized to implement the second retainer element 638, without departing from the scope of the disclosures described herein.

In one example, FIG. 6A schematically depicts the telescopic support strut 600 in a first configuration having the cylindrical extendable member 602 spaced apart from the outer housing 604. As such, FIG. 6A schematically depicts the first compression element 624 and the second compression element 634 in respective first compressed states. In one example, the depicted configuration of the first compression element 624 and the second compression element 634 in FIG. 6A may be referred to as a neutral state.

FIG. 6B schematically depicts the telescopic support strut 600 in a second configuration. In particular, FIG. 6B depicts the cylindrical shaft 630 of the lock mechanism 612 in contact with a misaligned pin structure 608 of the outer housing 604. In particular, FIG. 6B schematically depicts the pin structure 608 as being misaligned with the cam channel 610. As such, the pin structure 608 may not be received into the cam channel 610, and the lock mechanism 612 may slide relative to the outer wall structure 620 of the cylindrical extendable member 602. Simultaneously, the lock mechanism 612 may compress the first compression element 624 against the retaining surface 626. In this way, compression of the first compression element 624 may prevent damage to one or more components of the outer housing 604 and/or the cylindrical extendable member 602, due to misalignment between the pin structure 608 and the cam channel 610. Accordingly, in order to align the pin structure 608 with the cam channel 610, the outer housing 604 may be rotated relative to the cylindrical extendable member 602, as schematically depicted by arrow 638.

FIG. 6C schematically depicts the telescopic support strut 600 in a third configuration. In particular, FIG. 6C schematically depicts the telescopic support strut 600 having a cam channel 610 of the lock mechanism 612 aligned with a pin structure 608 of the outer housing 604. As such, FIG. 6C depicts the first compression element 624 in a decompressed configuration relative to that configuration depicted in FIG. 6B. In one example, the first compression element 624 may be configured to urge the lock mechanism 612 to receive the pin structure 608 into the cam channel 610.

In one implementation, the sliding of the lock mechanism 612 relative to the wall structure 620 of the cylindrical extendable member 602 may be utilized to accommodate/allow for manufacturing tolerances used to manufacture the telescopic support strut 600. In another example, a depth 640 of the cam channel 610 may be utilized to accommodate manufacturing tolerances used to manufacture the telescopic support strut 600, and such that depth 640 is selected such that the pin structure 608 will align with the angled surface 642 of the cam channel 610, given the manufacturing tolerances associated with the manufacture of the telescopic support strut 600.

In one example, the cylindrical extendable member 602 may be rotated relative to the outer housing 604 in order to removably-couple the cylindrical extendable member 602 to the outer housing 604 in a contracted position. As such, arrow 644 schematically represents this relative rotation.

FIG. 6D schematically depicts a fourth configuration of the telescopic support strut 600.

In particular, FIG. 6D schematically depicts the pin structure 608 at an intermediate position in/partway through the cam channel 610. Accordingly, as the cylindrical extendable member 602 is rotated relative to the outer housing 604 (as schematically depicted by arrow 644), contact between the pin structure 608 and the cam channel 610 (specifically, the angled surface 642), urges the base plate 628 towards a first end 646 of the cylindrical extendable member 602. Simultaneously, the second compression element 634 is compressed between the base plate 628 and the upper plate 632, and the cylindrical shaft structure 630 extends out through the first end 646 of the cylindrical extendable member 602.

Figure 6E:
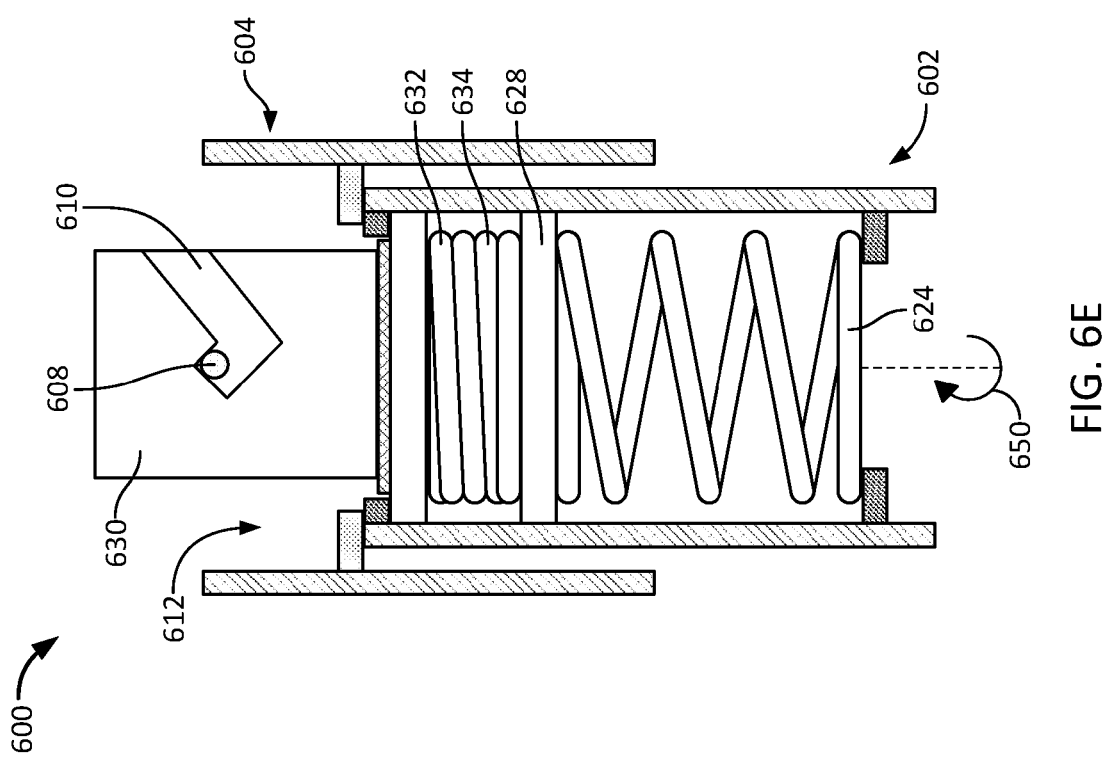

FIG. 6E schematically depicts the telescopic support strut 600 having the cylindrical extendable member 602 removably-coupled to the outer housing 604. In particular, FIG. 6E schematically depicts the pin structure 608 in a locked position within the cam channel 610, and such that a compressive force exerted by the second compression element 634 applies a force, otherwise referred to as a retention force, to the cylindrical shaft structure 630 in that direction indicated by arrow 648. In one example, the retention force maintains a removable-coupling between the cylindrical extendable member 602, and the outer housing 604.

In one implementation, the lock mechanism 612 may be configured to removably-couple the outer housing 604 to the cylindrical extendable member 602 by rotating the cylindrical extendable member 602 relative to the outer housing 604 through an angle of less than 360°, and corresponding to the progression of the configurations depicted in FIG. 6B, FIG. 6C, FIG. 6D, and the removably-coupled configuration depicted in FIG. 6E. As such, the lock mechanism 612 may be configured to removably-couple the cylindrical extendable member 602 to the outer housing 604 by rotating the cylindrical extendable member 602 relative to the outer housing 604 by an angle of less than 360° even when the cylindrical extendable member 602 is inserted into the outer housing 604 such that the pin structure 608 is misaligned with the cam channel 610, as depicted in FIG. 6B. In this way, the telescopic support strut 600 may be configured to be quickly configured into a removable-coupling between the cylindrical extendable member 602 and the outer housing 604. In one example, in order to decouple the cylindrical extendable member 602 from the outer housing 604, the cylindrical extendable member 602 may be rotated relative to the outer housing 604 in a direction schematically indicated by arrow 650. As such, in one example, the cylindrical extendable member 602 may be rotated relative to the outer housing 608 by an angle of less than 180° in order to decouple the cylindrical extendable member 602 from the outer housing 604.

Accordingly, this simple rotation of the cylindrical extendable member 602 relative to the outer housing 604 by an angle of less than 180° may allow for quick decoupling of the telescopic support strut 600 from the depicted removable coupling (transport/storage coupling) of the outer housing 604 to the cylindrical extendable member.

In one specific example, the cam channel 610 may be configured to receive the pin structure 608, and rotate through an angle ranging between approximately 70° and approximately 120° to a locked position, as schematically depicted in FIG. 6E.

Figure 7:
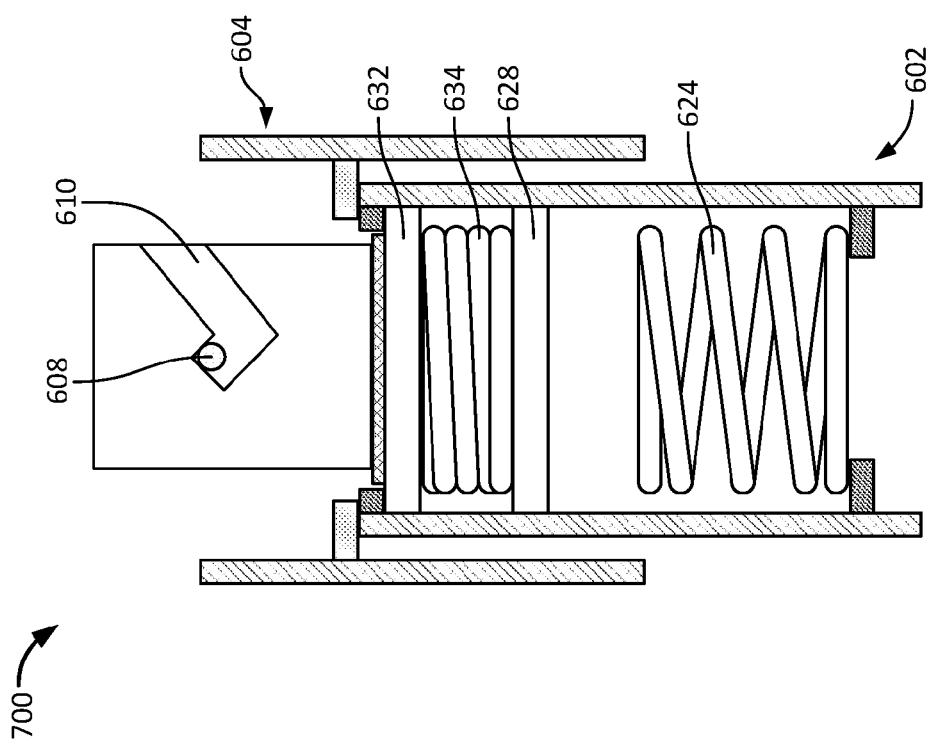
FIG. 7 schematically depicts another implementation of a telescopic support strut, according to one or more aspects described herein.

In one implementation, the first compression element 624 may remain in contact with the base plate 628 as the second compression element 634 is being compressed between the base plate 628 and the upper plate 632. This configuration is schematically depicted in FIG. 6D and FIG. 6E. Alternatively, and as depicted in FIG. 7, the first compression element 624 may not remain in contact with the base plate 628 as the second compression element 634 is compressed between the base plate 628 and the upper plate 632. Accordingly, FIG. 7 depicts a telescopic support strut 700, similar to telescopic support strut 600, and having the cylindrical extendable member 602 removably-coupled to the outer housing 604, similar to the schematic depiction of FIG. 6E.

Figure 8B:
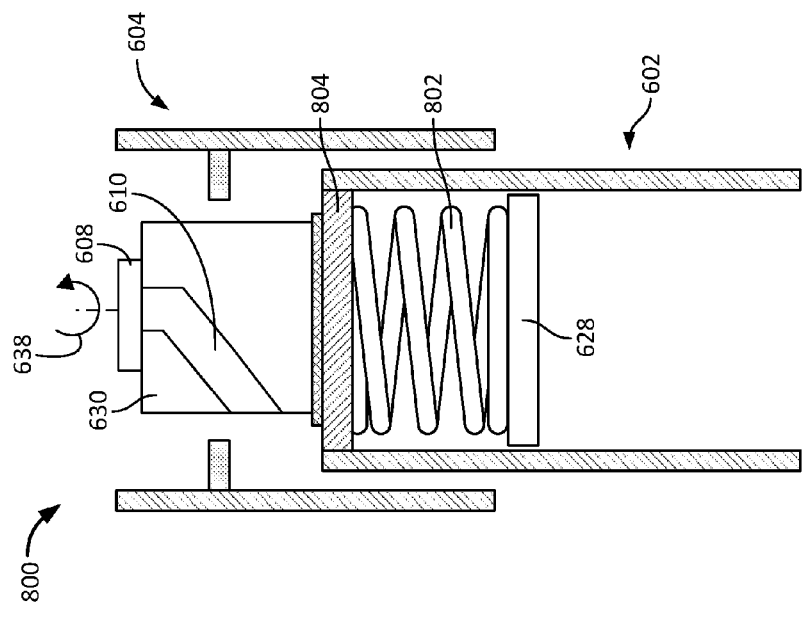
Figure 8A:
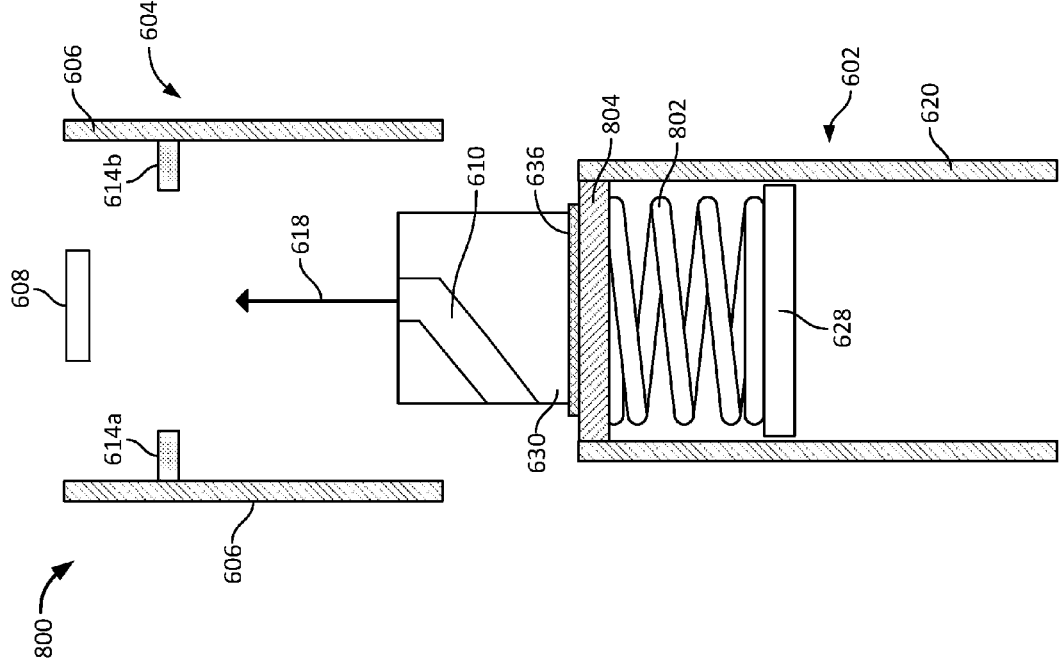

FIG. 8A schematically depicts an alternative implementation of a telescopic support strut 800. In particular, the telescopic support strut 800 may be configured to removably-couple the outer housing 604 to the cylindrical extendable member 602, utilizing a single compression element 802. In one example, the compression element 802 may be similar to compression element 634 from FIG. 6A. Accordingly, compression element 802 may be configured to compress between the base plate 628, and an upper plate 804. In certain embodiments, the upper plate 804 may be rigidly-coupled to the wall structure 620 of the cylindrical extendable member 602.

FIG. 8A, similar to FIG. 6A, schematically depicts the cylindrical extendable member 602 being moved, along that direction indicated by arrow 618, into a contracted configuration with the outer housing 604. FIG. 8B schematically depicts the pin structure 608 misaligned with the cam channel 610 of the lock mechanism 612. Accordingly, in order to align the pin structure 608 with the cam channel 610, the outer housing 604 may be rotated relative to the cylindrical extendable member 602, as schematically depicted by arrow 638. FIG. 8C schematically depicts the telescopic support strut 800 in a third configuration having the outer housing 604 removably-coupled to the cylindrical extendable member 602. In particular, FIG. 8C schematically depicts the pin structure 608 in a locked position within the cam channel 610, and the compression element 802 in a compressed configuration, exerting a retention force on the cylindrical shaft 630 in a direction indicated by arrow 806.

Figure 9:
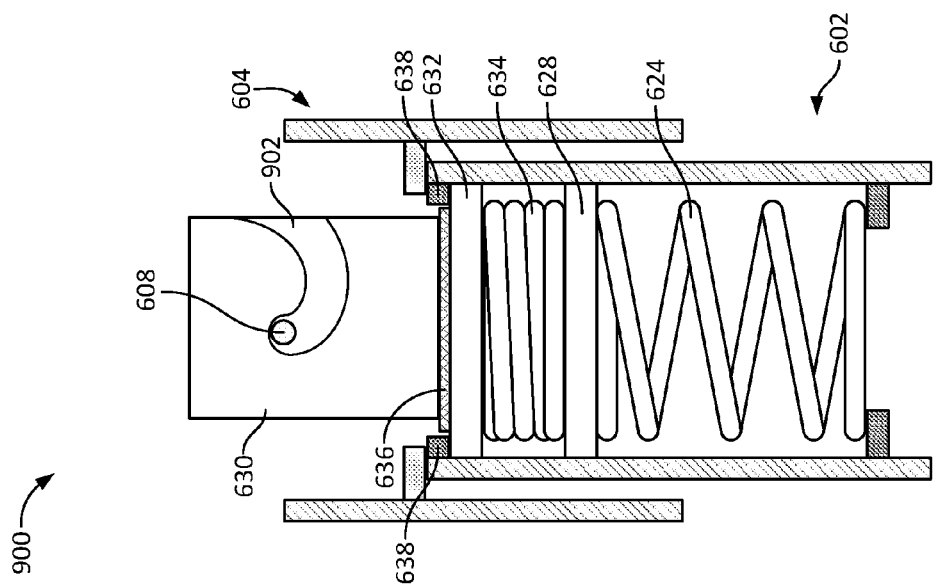
FIG. 9 schematically depicts an alternative implementation of a telescopic support strut, according to one or more aspects described herein.

FIG. 9 schematically depicts an alternative implementation of a telescopic support strut 900. In particular, FIG. 9 schematically depicts an outer housing 604 removably-coupled to a cylindrical extendable member 602, and having a pin structure 608 in a locked position within a cam channel 902. Accordingly, the cam channel 902 may have a curved geometry, different to that of cam channel 610 from FIG. 6A. As such, those of ordinary skill in the art will recognize that various additional or alternative geometries of a cam channel, such as cam channel 610 or cam channel 902, may be utilized with a lock mechanism, such as lock mechanism 612, without departing from the scope of the disclosures described herein. As such, the telescopic support strut 900 schematically depicts one alternative implementation of a cam channel 902, and various additional or alternative geometries may be realized without departing from the scope of the disclosures described herein.

Figure 10:
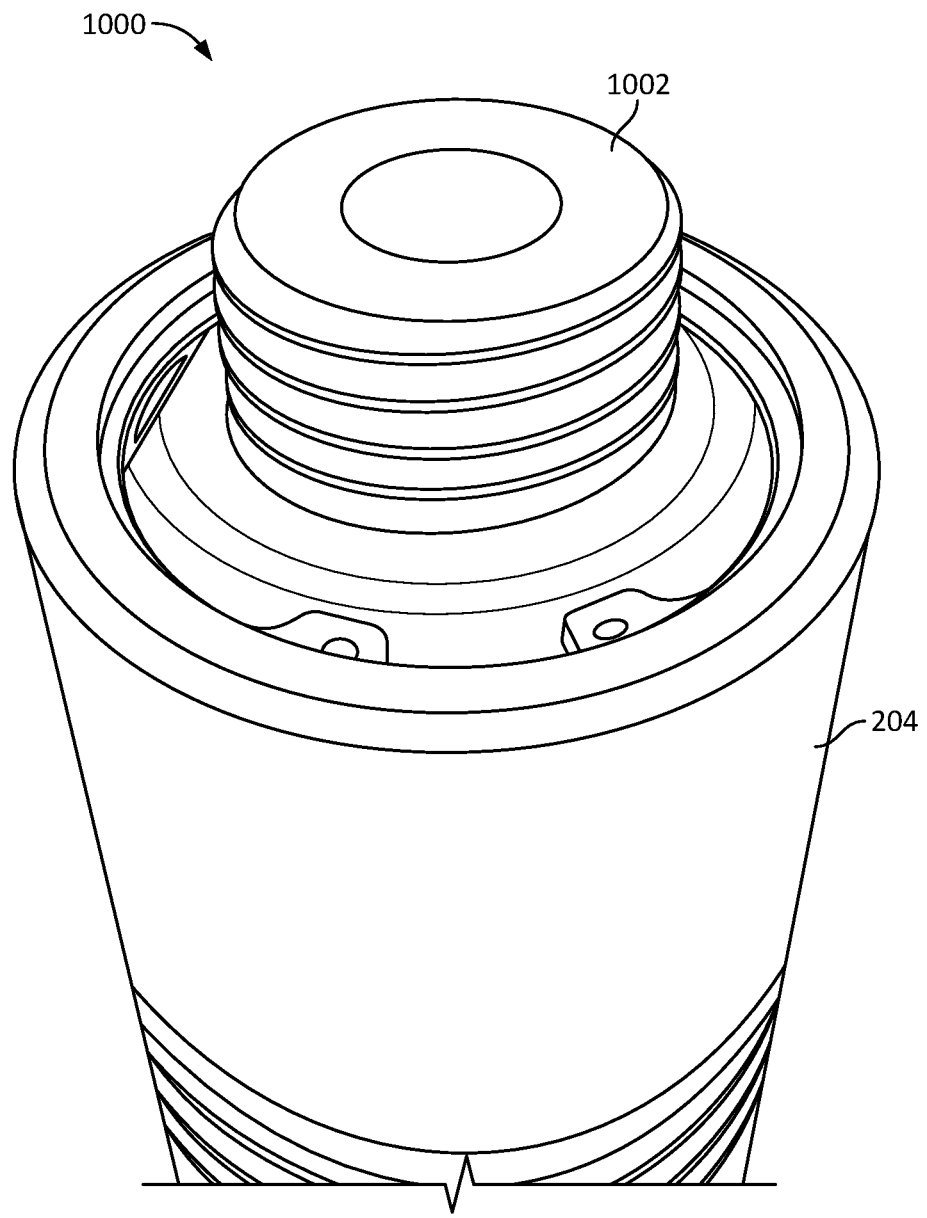
FIG. 10 schematically depicts an alternative implementation of an adjustable strut device, according to one or more aspects described herein.

FIG. 10 schematically depicts an alternative implementation of an adjustable strut device 1000. In particular, the adjustable strut device 1000 may comprise a cylindrical extendable member 204 configured to be received into an outer housing 202, as depicted in FIG. 2 and FIG. 3. Further, the adjustable strut device 1000 may be configured with a spring-loaded connector 1002, the operation of which is described in further detail in relation to FIGS. 11A-11C.

Figure 11B:
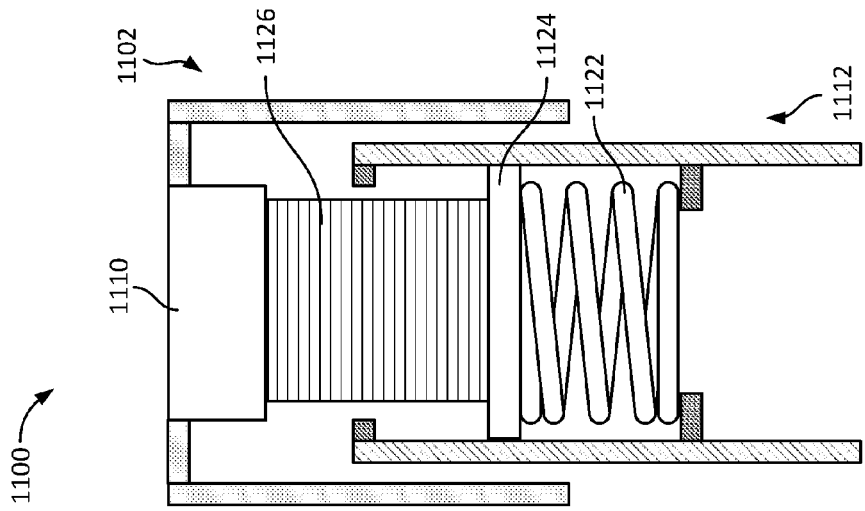
FIGS. 11A-11C schematically depict various configurations of an alternative implementation of a telescopic support strut, according to one or more aspects described herein.
Figure 11A:
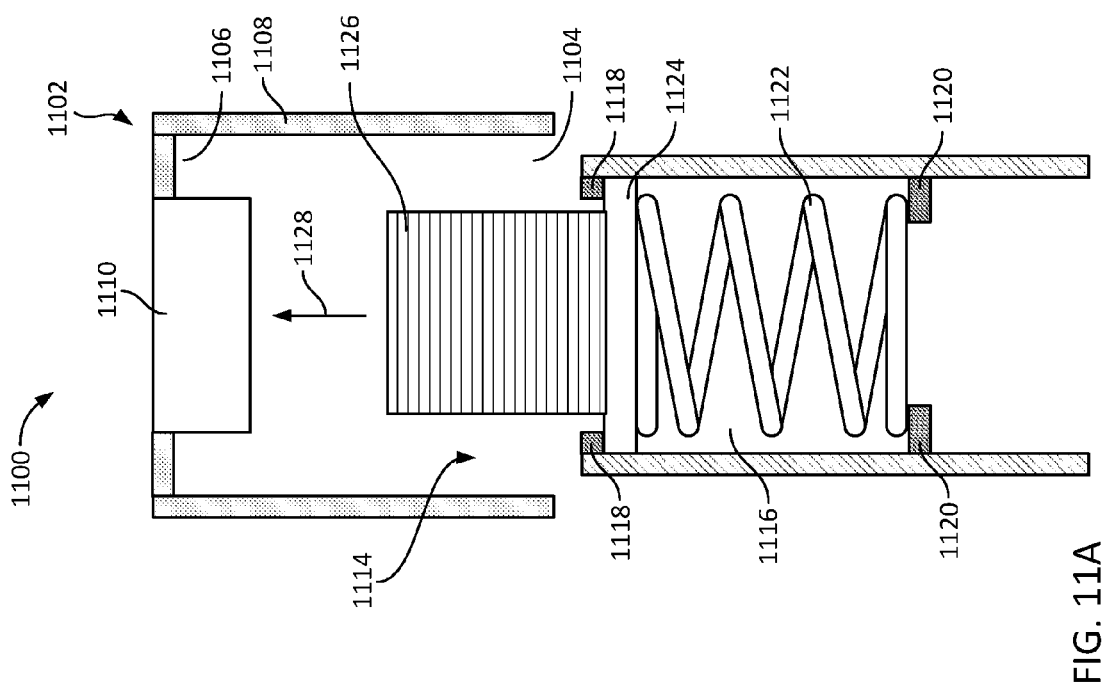

FIG. 11A schematically depicts an alternative implementation of a telescopic support strut 1100. In one implementation, the telescopic support strut 1100 may comprise an outer housing 1102 having a first end 1104, a second end 1106, a wall structure 1108, and a threaded receiver structure 1110. Additionally, the telescopic support strut 1100 may comprise a cylindrical extendable member 1112 having a spring-loaded connector 1114 partially-retained within a cavity 1116 between a retainer element 1118 and a retaining surface 1120. Further, the spring-loaded connector 1114 may comprise a spring element 1122 sandwiched between the retaining surface 1120 and a base structure 1124. Additionally, the spring-loaded connector 1114 may comprise a threaded cylindrical shaft 1126 configured to be received into the threaded receiver structure 1110.

In one implementation, FIG. 11A schematically depicts the cylindrical extendable member 1112 being moved, along that direction indicated by arrow 1128, into a contracted configuration with the outer housing 1102. As such, FIG. 11A schematically depicts the cylindrical extendable member 1112 sliding relative to the outer housing 1102 along a longitudinal axis corresponding to that depicted arrow 1128.

FIG. 11B schematically depicts the telescopic support strut 1100 in a second configuration. In particular, FIG. 11B depicts the threaded cylindrical shaft 1126 abutting the threaded receiver structure 1110, and such that the spring element 1122 is compressed between the base structure 1124 and the retaining surface 1120.

Figure 11C:
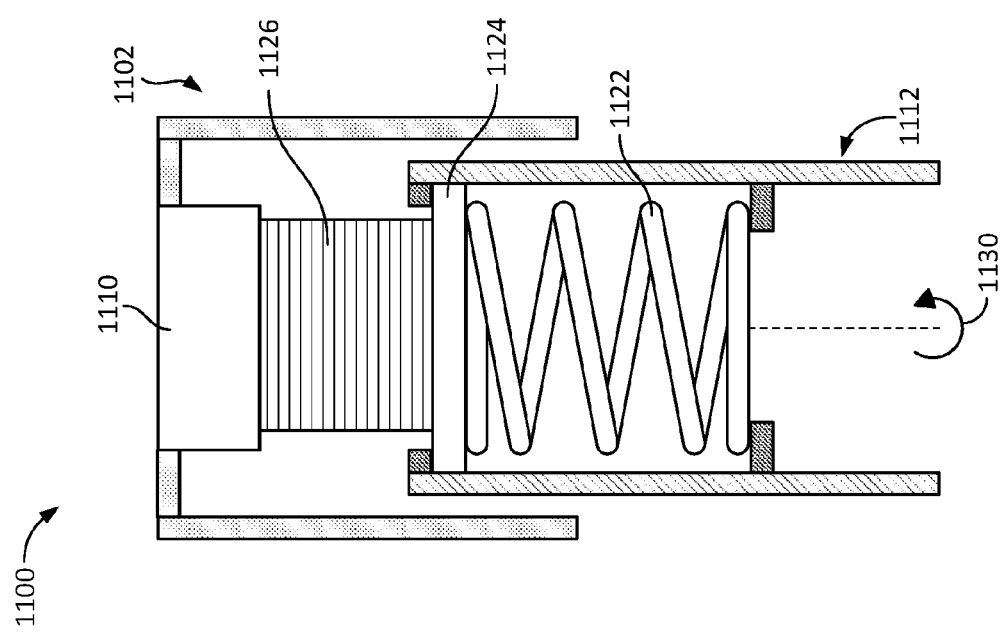

FIG. 11C schematically depicts the telescopic support strut 1100 in a third configuration with the cylindrical extendable element 1112 removably-coupled to the outer housing 1102. As such, FIG. 11C schematically depicts the threaded cylindrical shaft 1126 received into the threaded receiver structure 1110 as a result of relative rotation between the cylindrical extendable member 1112 and the outer housing 1102, as schematically depicted by arrow 1130.

We claim:

1. An adjustable strut, comprising:
    an outer housing having a first end, a second end, and a cylindrical bore;
    a cylindrical extendable member having a first end, a second end, and a longitudinal length, the first end of the cylindrical extendable member received into the cylindrical bore through the first end of the outer housing, and the cylindrical extendable member slidable along a longitudinal length of the cylindrical bore between a fully-extended position and a contracted position;
    a lock mechanism received into a cavity in the first end of the cylindrical extendable member, the lock mechanism retained within the cavity by a first retainer element at the first end of the cylindrical extendable member, and configured to removably couple the outer housing to the cylindrical extendable member when in the contracted position, the lock mechanism further comprising:
        a cylindrical shaft having a first end with a cam channel configured to receive a pin, said pin rigidly-coupled at the second end of the outer housing;
        a base plate, rigidly-coupled to a second end of the cylindrical shaft;
        an upper plate having a bore configured to receive the cylindrical shaft, the upper plate configured to slide along a longitudinal length of the cylindrical shaft; and
        a compression element having a bore configured to receive the cylindrical shaft, the compression element configured to be compressed along the longitudinal length of the cylindrical shaft between a first surface of the base plate and a first surface of the upper plate, and the compression element configured to urge the upper plate towards a second retainer element that is coupled to the longitudinal length if the cylindrical shaft at a position between the first end and the base plate,
    wherein upon rotation of the cylindrical extendable member relative to the outer housing in a first direction about a longitudinal axis of the cylindrical bore, the pin travels along the cam channel to a lock position, and simultaneously, the base plate is urged towards the first end of the cylindrical extendable member, the resulting compression of the compression element exerting a retention force on the pin.

2. The strut of claim 1, further comprising:
    a coil spring, configured to compress along the longitudinal length of the cylindrical extendable member, the coil spring retained within the cavity between a retaining surface and the base plate of the lock mechanism.

3. The strut of claim 2, wherein the lock mechanism is configured to slide along the longitudinal length of the cylindrical extendable member within the cavity, the lock mechanism retained within the cavity between the coil spring and the first retainer element.

4. The strut of claim 1, wherein the cylindrical extendable member further comprises:
    a thread structure along the longitudinal length of the cylindrical extendable member; and
    a threaded collar configured to engage with the thread structure such that the threaded collar may be screwed to a position along the longitudinal length of the cylindrical extendable member between a first end and a second end of the thread structure.

5. The strut of claim 4, wherein a first surface of the threaded collar is configured to abut the first end of the outer housing to selectively configure the strut with a length between the fully-extended position and the contracted position.

6. The strut of claim 1, wherein the cylindrical extendable member further comprises at least one tab structure configured to prevent rotation of the base plate about the longitudinal axis of the cylindrical bore relative to the cylindrical extendable member.

7. The strut of claim 1, wherein the lock mechanism is configured to removably-couple the outer housing to the cylindrical extendable member in a contracted position by rotating the cylindrical extendable member about the longitudinal axis relative to the outer housing by an angle of less than 360 degrees.

8. The strut of claim 1, wherein the compression element is a coil spring.

9. The strut of claim 1, wherein the compression element is a leaf spring.

* * * * *